Patented Apr. 7, 1953

2,633,930

UNITED STATES PATENT OFFICE 2,633,930

CENTRIFUGAL AIR SEPARATOR FOR REMOVAL AND CLASSIFICATION OF PARTICLES

William R. Carter, Edina, Minn.

Application June 10, 1950, Serial No. 167,465

6 Claims. (Cl. 183—77)

This invention relates to machines and apparatus for classifying and removing fine solid particles through the principle of centrifugal air separation.

In the past fifty years, considerable progress has been made in the collection and removal of dust from air and other gaseous media through cyclone dust collectors, centrifugal air separators and various filtering apparatus. Prior art devices, to my knowledge, have not accomplished many of the important desired results. Apparatus utilizing filtering elements become clogged after extensive use and require cleaning or replacing of elements at frequent intervals and the efficiency of separation and capacity is comparatively low. Cyclone dust collectors, while removing the larger particles have been inefficient to remove very fine particles from air. The centrifugal air separators of the prior art have produced turbulence outside of the main separation vortex reducing separating efficiency and furthermore, producing reduction of particle size through attrition and the impacting of particles, one against the other. Centrifugal air separators of the prior art all to my knowledge, have employed centrifugal vanes or blades or fling arms of some nature well adapted in some instances for comminuting particles or pulverizing operations but poorly suited for efficient and fast separation of fine particles from air or gaseous medium.

It is an object of my invention to provide a machine and apparatus for very efficiently and rapidly separating and removing substantially all fine particles from a gaseous medium with the elimination of disturbing turbulence, through centrifugal air separator principle.

A further object is the provision of a centrifugal dust collector which will produce a desired vortex and angular velocity of air without employment of any vanes or blades and which will maintain a substantially constant efficiency of separation although the air capacity is varied materially within wide limits.

Another object is the provision of a centrifugal, rotor-type air separator wherein at a given air capacity, the pressure drop across the separator will remain substantially constant even though there is a wide variation in the amount, type and particle size of material being separated.

More specifically, it is an object of my invention to provide an exceedingly efficient and comparatively simple air separator and particle classifier utilizing a high speed vortex produced by a multi disc rotor concentrically mounted in a cylindrical casing with the attendant draft or forcing of air through a multiplicity of perforations in the rotor discs by blower or fan located on or in communication with the separator disc tube or in the alternative in communication with the intake of the machine.

With my improved structure, the air containing fine particles of solid or semi solid material is given substantially the positive angular velocity of the rotor without employment of any vanes, blades or fling arms, thereby greatly reducing turbulence and the attendant material reduction of particle size which necessarily would lessen the speed and efficiency of separation. My improved apparatus while particularly adapted for air separation and dust collection, when embodied in multiple machines or successive rotor operations, is highly efficient and economical to classify and separate particles of desired different sizes from a source of material or from air or other gaseous media containing particles of varying size.

The foregoing and other objects will be more apparent from the following description made in connection with the accompanying drawings wherein like reference characters refer to similar parts throughout the several views and in which.

Referring now to the embodiment of my invention in Figs. 1 to 7 of the drawings, a cylindrical rotor casing 11 is employed being as shown, vertically disposed and having a smooth internal cylindrical wall, a closed top plate 12 provided with a central and axial intake passage 12a therein. A sealed cap casing 13 as shown, is secured to the top 12 of the rotor casing having a tangentially communicating air intake conduit 14 connected therewith. The rotor casing 11 is substantially closed by a bottom plate 11a at its lower end, said plate being centrally apertured to accommodate with close working clearance an air withdrawal tube 15 affixed and constituting a part of my rotor, said tube having spider collars 15a and 15b at its ends affixed to the lower portions of shaft 16.

Figures 1, 2, 3, 4, 5, 11, 12, 13:
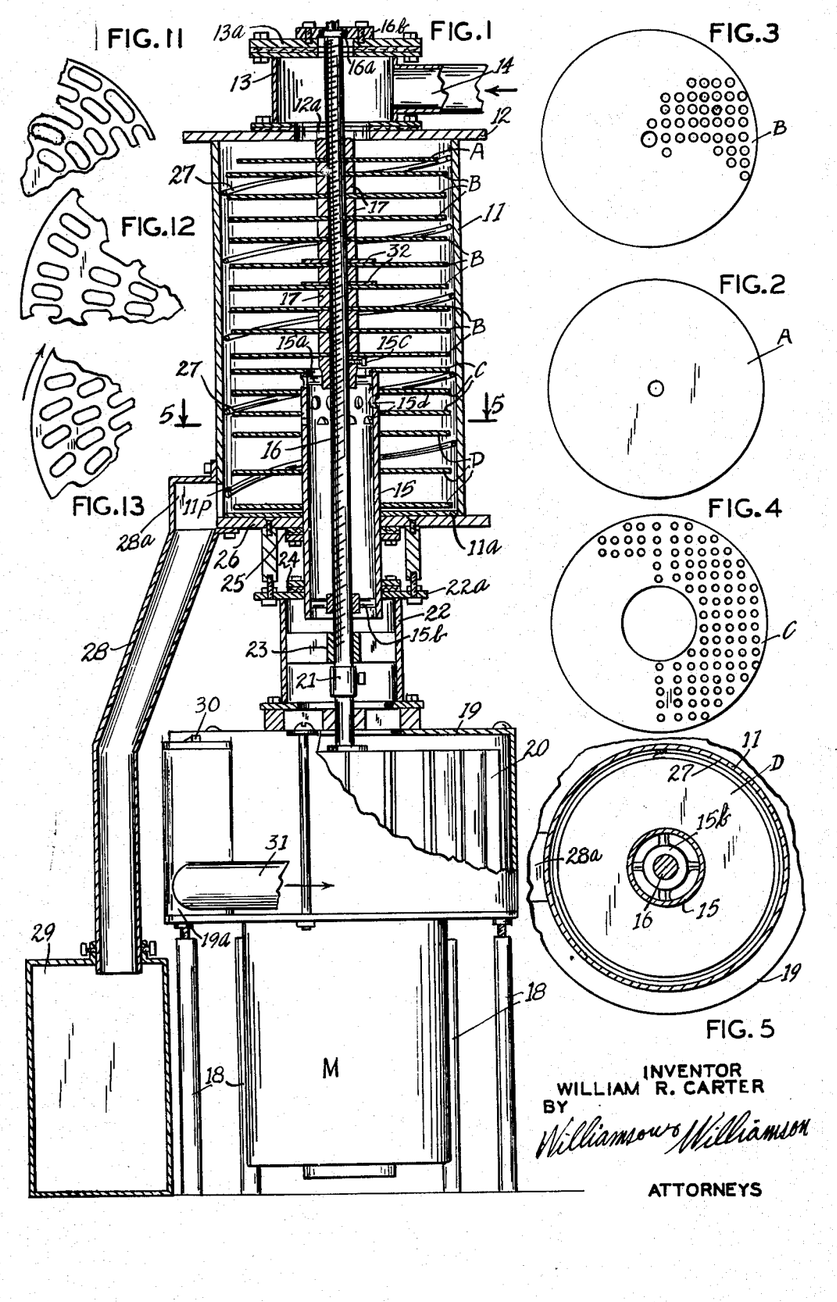
Fig. 1 is a view mostly in vertical section taken axially through an embodiment of my centrifugal air separator where air containing fine particles is drawn through the upper end of the machine in a downward direction and the solid or other particles contained therein removed tangentially from the lower portion of the rotor casing.
Figs. 2, 3 and 4 are detail plan views of three different types of discs utilized in the composition of the rotor shown in the forms of machine illustrated in Fig. 1.
Fig. 5 is a cross section taken on the line 5—5 of Fig. 1.
Figs. 11 to 13 inclusive are fragmentary plan views showing other types of foraminous discs and apertures formed therein, which are within the scope of my invention.
Figure 6:
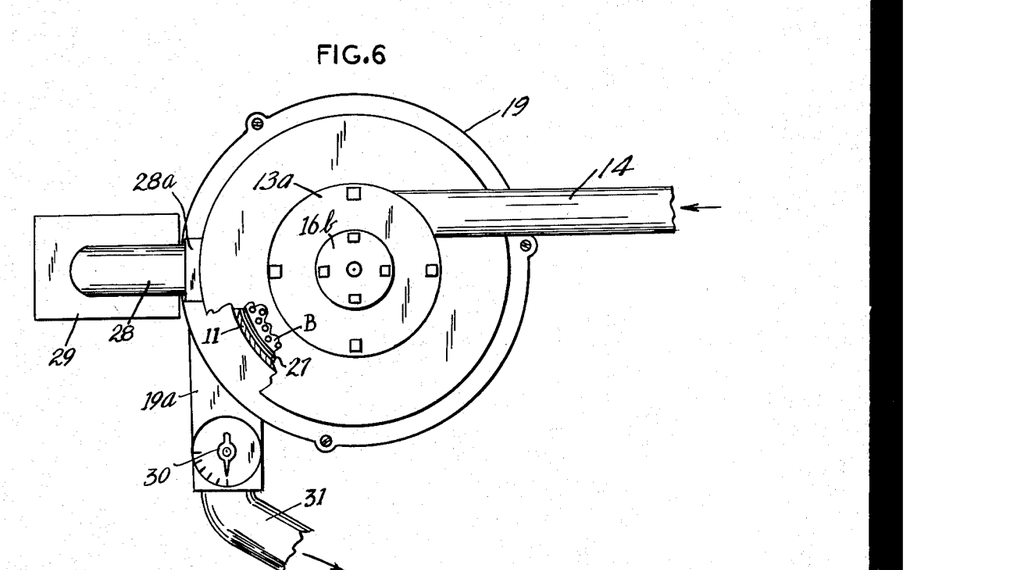
Fig. 6 is a top plan view of the machine of Fig. 1 with some portions broken away.
Figure 7:
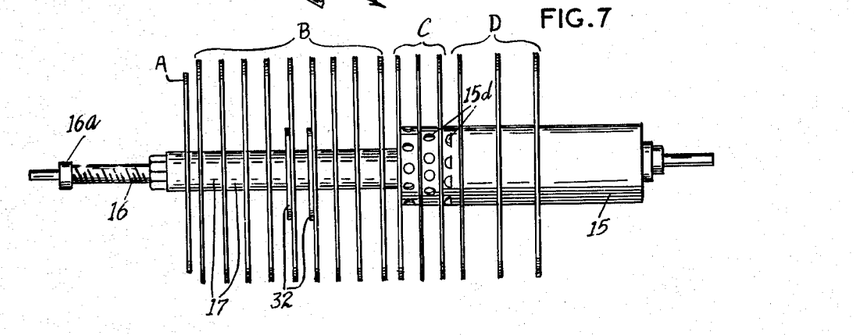
Fig. 7 is a side elevation of the complete rotor of a form of my invention illustrated in Figs. 1 to 6, removed from the casing and mounting.

My rotor is fixedly mounted upon a vertical shaft 16 journaled in suitable bearings provided at its upper and lower portions, the upper end of said shaft as shown, being provided with a suitable thrust bearing 16a which is mounted in the top of the cap member 13 and makes provision for a substantial air seal between a suitable collar and a compressible dust plate 16b bolted or otherwise secured to the top 13a of the cap member.

A plurality of flat, smooth faced discs are affixed in vertically spaced relation to the rotor shaft 16, all being mounted within the casing 11 and having in cooperation extremely important functional relation in the operation of my machine. As shown, the uppermost discs are spaced apart by screw threaded spacer collars 17 which threadedly engage the externally threaded shaft 16. The spider collar 15a securing the upper end of air withdrawal tube 15 as shown, is provided with a set screw 15c for securing the same to rotor shaft 16. The successive disc spacer collar 17 above said spider collar may be screwed down against the disc below with the spider collar acting as an anchoring base.

In the form of the invention shown in Figs. 1 to 7 the majority of the discs utilized and all between the uppermost disc A and one of the lower discs D below the top of withdrawal tube 15 are provided with closely spaced apertures which as shown in Figs. 3 and 4 of the drawings, are in the form of closely spaced circular holes ranging from preferably $\frac{3}{32}$ to $\frac{5}{16}$ of an inch in diameter depending on the use of the machine. It will be understood that in lieu of the circular holes, narrow slots extending either radially or circumferentially and concentrically of the discs may be utilized as shown in Figs. 11, 12 and 13 as well as other foraminous disc structures having preferably smooth upper and lower surfaces.

The top disc indicated by the letter A of the rotor is imperforate to act as a centrifugal distributor to material and air entering the rotor housing through the axial intake passage 12a in the top. This disc A is preferably of somewhat smaller diameter than the next successive disc B, lower in the series. The intermediate discs designated by the letter B (see Fig. 3), which are disposed in spaced relation between the top disc A and the upper end of the withdrawal tube 15 are foraminous or perforated as shown in Fig. 3.

A second series (as shown, three) of spaced perforated discs C (see Fig. 4) surround and are rigidly secured to the upper portion of withdrawal tube 15 and are of the same outside diameter as shown, as the intermediate disc B. These discs may if desired, be provided with circular perforations of the same diameter as those used in disc B.

The lowermost disc of the rotor and in many installations as in the form now described, two or more discs D are affixed to and surround the intermediate portion of air withdrawal tube 15 and are imperforate to exclude upward and downward travel of particles therethrough.

The lower end of the rotor housing is suitably supported from the stand or pedestal 18 which also serves as the support and base for a motor M positioned in the form shown with its armature shaft coaxial with the rotor shaft 16. A large capacity blower comprising a blower housing 19 and a blower rotor 20 is mounted on the frame or pedestal 18, the rotor 20 being affixed to an extension of the armature shaft of the motor, as shown and being disposed coaxially with and interconnected as by a coupling 21 with the lower end of the rotor shaft 16. Interposed between the lower end of the air withdrawal tube 15 and the intake or top central portion of the blower housing is a short cylindrical chamber 22 disposed coaxially of the separator rotor and the air withdrawal tube 15 and carrying as shown medially of its height, a spider supported bearing 23 for journaling the lower portion of the separator rotor shaft. The cylindrical chamber 22 is closed at its top about the rapidly revolving air withdrawal tube 15 through the medium of a compressed felt sealing washer 24 adjustably clamped upon the centrally apertured top 22a.

If desired, a second felt sealing washer 25 may be clamped to the base plate 26 of the separator housing, the compression of this washer as in the case of washer 24 causing the inner periphery of the felt to wipe the rotating medial portion of the withdrawal tube 15.

The lower end of air withdrawal tube 15 is preferably terminated some distance below the top 22a of the chamber 22. The lower end of the chamber 22 is in sealed communication with the central axial intake at the top of the blower casing 19.

To assist in centrifugally guiding the heavier particles downwardly in the centrifugal separation action and to further offer a barrier to upward travel of lighter particles in the vortex surrounding the rotor, I provide a helical guide element 27 as shown in the form of a round rod or wire helically formed to the interior cylindrical wall of housing 11 and affixed thereto, as clearly shown in Fig. 1.

At the bottom of housing 11 a tangential passage 11p is formed for the discharge of separated particles. This passage, as shown, communicates with an enlargement 28a in the upper end of a discharge conduit 28 which may removably communicate with the upper end of a container 29 for receiving the separated particles.

Air freed from substantially all particles is discharged tangentially through the blower casing 19, passing through a discharge duct 19a which as shown has connected therewith a conduit 31. A suitable air valve control 30 is provided in the discharge duct 19a for adjusting the system for the desired air flow.

Operation

In operation, the separator rotor and blower are driven at relatively high speed depending upon the particular nature of the use, the R. P. M. of the rotor usually being within a range of from 1800 to 5000 R. P. M. The air flow is produced by the blower or multi stage blowers (if same are used) drawing air containing impurities and particles inwardly and downwardly through the intake conduit 14 into the top and central portion of the rotor housing 11. The air valve control 30 is adjusted for the desired air flow. Entering air in the top of housing 11 with the dust or other particles carried thereby strikes against the top imperforate disc A and is centrifugally moved outwardly thereby whereafter the heavier particles are centrifugally thrown into the rapid vortex created by the fast revolution of the entire rotor structure. In the form of Fig. 1, the general movement of air is downwardly and inwardly while the movement of particles is centrifugally outward.

Air with fine particles therein passes inwardly and successively through the foraminous or perforated discs B and C, the successive smooth discs setting up an angular velocity of air substantially equal to the angular velocity of the rotor. The descending air vortex so created is substantially free of interfering turbulence since no blades, arms, or vanes are employed by any of the discs utilized in my rotor. The axial portion within the rotor housing is of course maintained at substantially low pressure, lower than the pressure of the vortex set up between the periphery of the rotor and the rotor housing level. Consequently, air is constantly flowing through the perforated discs and downwardly in the form of the invention shown in Fig. 1 carrying with it the finer and lighter particles which may pass through the apertures of the discs and which are successively thrown out centrifugally by the smooth discs into the vortex at the inner wall of the cylindrical housing.

In some instances it is desirable to provide two or more of the intermediate perforated discs B with imperforate disc cover plates 32 closing the central apertures of such discs to prevent small particles from directly passing downwardly along the periphery of the rotor hub.

The air withdrawal tube 15 it will be noted, is open at its upper end and is furthermore provided with several series of relatively large radial air passage ports 15d in the upper portion thereof, all disposed above the series of imperforate discs D adjacent the bottom of the rotor housing. The angular velocity of the air and particles entrained thereby is always substantially the same as the angular velocity of the perforated discs if the air passes through the discs, thus providing a positive rotating force for cleaning the air with a minimum of slip and turbulence. The separating ability of my air centrifuge may be expressed by the following relation:

$$F = \frac{Wv^2}{gR} = .00341 W R n^2$$

where:

$F$ = force in pounds
$W$ = weight of particle in pounds
$R$ = radius of circle of rotation in feet
$n$ = speed in R. P. M.

From the foregoing equation, it will be evident that the higher the speed and the larger the diameter of rotation, the higher will be the separating force applied to separate the heavier particles from the lighter air. It further will be evident that a higher speed is more effective than a larger diameter since the separating force varies as the square of the speed but directly with the diameter of the circle of revolution.

After the air is passed through a number of the perforated discs the air enters the central discharge tube through the open upper end as well as through the radial ports 15d. The clean air is discharged from the separator by downward passage through tube 15 and then through the blower and out through the blower discharge duct 19a. All particles are ultimately centrifugally thrown out to the casing wall or to the descending vortex set up in proximity to the wall and are then conveyed downwardly to the bottom of the separator through the cooperating force of gravity and the guiding effect of the helical wire or rod 27. The rotating imperforate discs D at the lower end of the rotor prevent recirculation of the particles and act to throw all particles through discharge port 11p at the bottom of the rotor housing.

With my air centrifuge construction, the efficiency of separation will remain practically constant at varying air capacities within a very wide range and up to the rating of the blower. Another definitely established characteristic of my structure is that at a given capacity, the pressure drop across the separator from intake to air discharge will remain constant with a wide variation in the amount and type of material or particles being separated from the air.

The perforations or passages through the foraminous discs of my rotor are not intended to nor do not function as filter elements. They will not clog since any tendency for accumulation of minute particles in the passages through the discs increases air velocities until a carrying air velocity is reached. I have found that the diameter of the apertures in the discs or the width of slots utilized as in the type of discs illustrated in Fig. 11 and Fig. 12 should not be in excess of two and one half times the thickness of the discs.

The speed of separation of my structure is maximum for the reason that no disruptive turbulence is produced common to most conventional centrifugal separators because of the use of blades, vanes or arms in the rotor. The smooth discs in spaced series develop an angular velocity of the air substantially equal to the R. P. M. of the rotor while nevertheless minimizing the effect of impaction of particles against the interior of the housing or the striking of particles against particles which is present where turbulence is set up.

Figure 8:
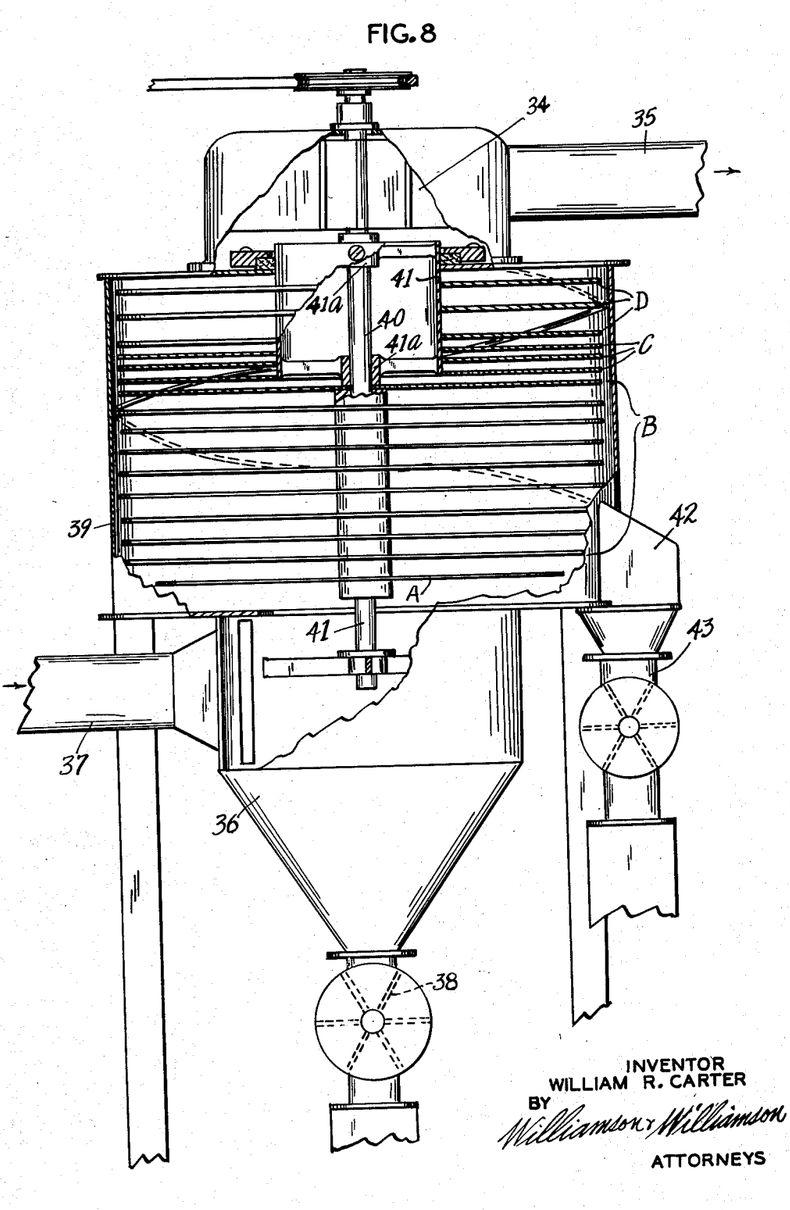
Fig. 8 is a view partly in side elevation but mostly in vertical section of another embodiment of my invention wherein the inlet for air containing particles of solid or semi solid material is provided at the lower end of the rotor casing and wherein the flow of air is upwardly through the machine with the discharge of the purified air drawn off by partial vacuum from the upper portion of the machine.

In the form of the invention shown in Fig. 8, the flow of air is upwardly through the centrifugal separator and the air freed from particles is discharged tangentially from the blower 34 and its discharge duct 35. Air containing particles or dust in the machine of Fig. 8 enters the upper portion of a conventional cyclone dust collector 36 through an air duct 37 tangentially communicating therewith and the heavier patricles contained by the entering air in the cyclone or rapid vortex produced at the top of cyclone casing 36 are centrifugally collected and by gravity dropped to the lower tapered end of the cyclone collector where they may be discharged by a conventional air lock valve 38. The top of the cyclone dust collector housing 36 is in open communication with the bottom central portion of the separator-rotor housing 39 of cylindrical shape. A multi disc rotor of general structure similar to the rotor in the form of my invention first described (but in inverted relation) is mounted for revolution within cylindrical housing 39, the lowermost disc A thereof being imperforate for function as a distributor disc to entering air with entrained particles and the next successive discs B being affixed to the rotor shaft 40 and surrounding the same and being foraminous as in the case of the discs B of the first form described. The rotor includes a relatively large diametered air withdrawal sleeve affixed to the rotor shaft 40 by spider collars 41a and having its ends open for communication with the interior of blower casing 34. As shown, three perforated or otherwise foraminated discs C surround air withdrawal sleeve 41 and are rigidly fixed thereto, said discs being as shown, more closely spaced together than the discs B.

Above the foraminous discs C I provide a series (as shown, three) of imperforate discs surrounding sleeve 41 and rigidly affixed thereto. The finer particles are withdrawn tangentially from the lower portion of the separator housing 39 by centrifugal force and gravity, passing into a tangentially disposed duct 42 which communicates with a funnel-like depending hopper 43 having as shown, an air lock valve or dispensing element connected therewith.

In the last described form of my apparatus, air is withdrawn upwardly through the centrifuge by the blower 34 causing the air with smaller particles entrained thereby to move upwardly from the cyclone dust collector 36 and to first strike the imperforate distributor disc A and to thereafter be drawn inwardly with the finest particles entrained, such air by centrifugal force and passage through the perforations of the discs B and C being given an angular velocity substantially equal to that of the rotor. The finer particles are rapidly centrifuged by the smooth surfaces of the perforated discs and ultimately collect in the rapid vortex at the periphery of the rotor and dropped with aid of gravity to the lower portion of the housing 39 and are ultimately discharged through the tangential duct 42. Thus, it will be seen that classification and separation of two sizes of particles is accomplished.

Figure 10:
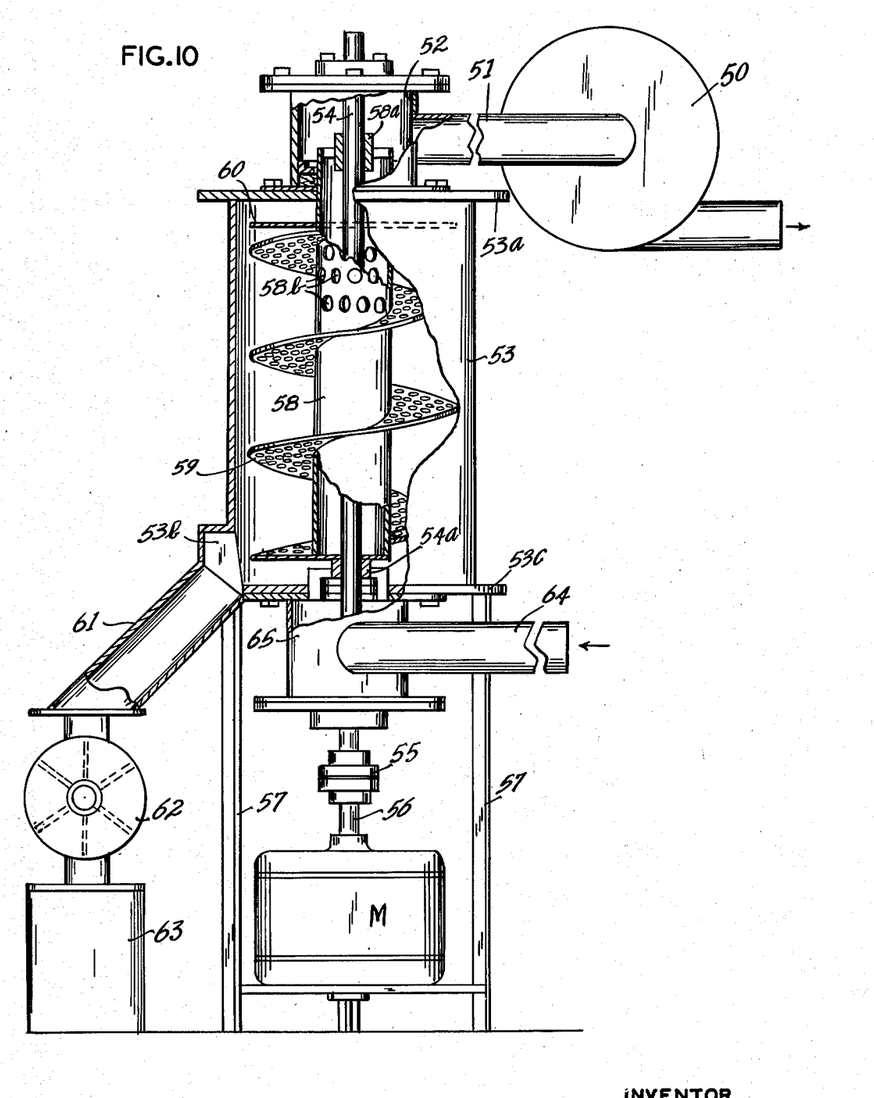
Fig. 10 is a view mostly in vertical section taken axially through another embodiment of my invention wherein a foraminous or perforated spiral rotor is utilized in lieu of the multiplicity of perforated discs provided in the forms of my invention illustrated in the other sheets of drawings herein.

In the form of the invention shown in Fig. 10, the flow of air is upwardly as in the form last described, being set up by means of a high speed blower 50 having its axial portion connected by a conduit 51 with a top cap chamber 52 mounted on the top 53a of the cylindrical separator housing 53. The rotor of this form is mounted upon a vertical rotor shaft 54 journaled in suitable bearings at its upper and lower ends and as shown, connected by flexible coupling 55 at its lower end with the extended armature shaft 56 of an electrical motor M mounted in the base of the upright supporting frame 57. The blower 50 is of course driven by a separate motor. My rotor in this form includes a sleeve 58 extending nearly the full height of the separator housing and closed at its lower end but open at its upper end and affixed to rotor shaft 54 by a collar 54a at the lower end and a spider collar 58a at the upper end, the upper end of said sleeve being preferably disposed above the bottom of the cap chamber 52. The upper portion of sleeve 58 constitutes an air withdrawal tube and is provided with a multiplicity of radial ports 58b which enable air to enter the upper portion of the tube from within the top part of the separator casing.

In this form of the invention instead of series of perforated discs with end imperforate discs, I provide a foraminous spiral or helical integral element 59 surrounding the sleeve 58 and being rigidly secured along its inner spiral edge thereto. The peripheral edge of the helical separating element 59 is coaxial with shaft 54 and the interior of casing 53 and is spaced a short distance therefrom. An imperforate disc 60 surrounds and is affixed to the upper portion of sleeve 58 above the helical separator element 59.

The solid or other particles separated from the air are moved by centrifugal force and gravity and conveyor action of the rotor downwardly and against the inner peripheral wall of housing 53 and pass out of the separator housing tangentially through a passage 53b which communicates with a declined duct 61 having in communication with the lower end, a rotary air lock valve 62 feeding the material to a collection receptacle 63.

In operation, this form of the invention illustrated in Fig. 10 functions in a manner generally similar to the apparatus previously described. The rotor is driven in a direction to assist in conveying solid material downwardly rather than upwardly. The air laden with dust or other particles enters through a conduit or duct 64 communicating tangentially with the lower cap member 65 which has communication at its top with the bottom 53c of the separator housing. This air with the particles carried thereby first strikes against the imperforate lower end of sleeve 58 and is distributed outwardly and centrifugally by the rapidly revolving rotor. Air travel is then upward through the stages of the helical perforated separator element 59, this element with the passage of air therethrough, setting up an angular velocity of the air within the housing 53 substantially equal to the angular velocity of the rotor. The particles are thrown outwardly by centrifugal force and the smooth surface of the helical separator element while air continues to pass inwardly and upwardly through the perforations or apertures in the element 59. The air is ultimately drawn through the relatively large air ports 58b into the sleeve 58 and thereafter is exhausted through the upper cap chamber 52 and conduit 51 into the blower from where it is tangentially discharged.

Figure 9:
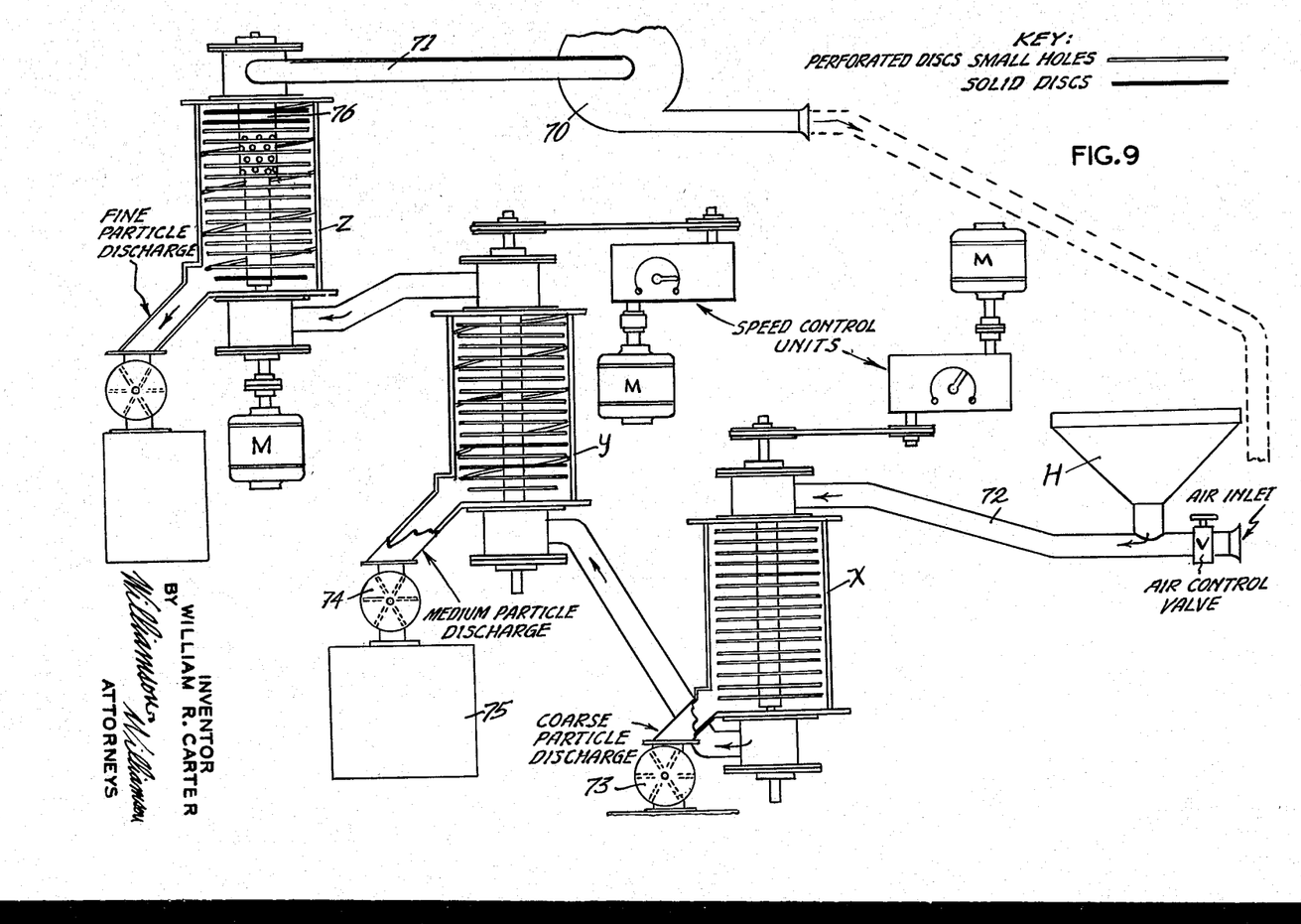
Fig. 9 is a diagrammatical view illustrating the connection and relation of three of my centrifugal separators for classification and removal of particles within three size ranges and ultimate discharge of air substantially free of all solid particles.

In Fig. 9 I diagrammatically illustrate a classifying and air centrifuge system wherein particles of three different sizes are successively withdrawn from entering air wherein they are mixed and the air substantially freed from all particles discharged for further use or recirculation if desired. Three centrifuge separators indicated generally by the letters X Y and Z are connected in series and air is drawn through said series as shown, by a powerful high speed blower 70 connected with the air discharge conduit 71 of the last separator in series.

Each of the air separators X and Y is provided with its own motor M and speed control unit shown as connected by belting with the rotor shaft of the separator. A hopper H for containing granular or powdered material or other particles communicates at its lower diminished end with the air supply duct 72. An air control valve is shown disposed outwardly of the communication between hopper H and duct 72. The flow of air through the conduit 72 includes a comparatively uniform flow of the comminuted solid material from hopper H, the air and entrained particles entering the top of the first centrifuge separator X. The rotor of separator X as shown, is composed entirely of perforated discs, the heavier and larger particles being centrifugally thrown outwardly and dropping by gravity to the lower portion of the housing and thereafter discharged from the housing through a tangential passage which communicated with a duct entitled "Course Particle Discharge" which in turn communicates with a rotary air lock valve 73. The air in the system with the smaller particles entrained thereby is drawn axially from the lower end of the housing of separator X passing upwardly therefrom to the lower end of the housing of the second air separator Y. Separator Y has a rotor also, as shown, comprising a series of perforated discs only. The flow of air through separator Y is upwardly and as shown, a spiral guide wire or rod is secured to the inner peripheral wall of the housing to assist in working the heavier particles downwardly. The particles centrifugally thrown into the vortex surrounding the rotor are collected by a duct communicating tangentially with the bottom of the housing of separator Y and passed downwardly, as indicated in Fig. 9 by the legend "Medium Particle Discharge" through a rotary air lock valve 74 into a collector receptacle 75.

Air with entrained fine particles is withdrawn from the upper end of the centrifuge separator Y and passes as shown, into the lower end of the third centrifuge separator Z. This separator is of the general structure shown in Fig. 8 of the drawings, having an imperforate disc at the lower end thereof which is first contacted by entering air and serves as a centrifugal distributor. The remaining discs with the exception of the two uppermost discs affixed to the air withdrawal sleeve are foraminous, having formed perforations or slots in accordance with the various teachings herein. The flow of air is upwardly through the separator Z, the fine particles being thrown centrifugally by the various discs and the air substantially freed from all particles passing through radial ports in the air withdrawal sleeve 76 and then being withdrawn from separator Z and from the entire classification system through the duct 71 which communicates with the intake of the blower 70.

With the system just described, by proper regulation of air control entering the system and the speeds of the units X and Y classification and collection of particle sizes within three ranges may be obtained by the use of my apparatus in continuous operation.

The term "uninterrupted" as used in the appended claims comprehends discs or spiral centrifuging elements having continuous surfaces which are not interrupted by vanes, blades or other barrier means to in any way restrict slipping of particles or air circumferentially or radially of the rotor axis.

It will of course be understood that various changes may be made in the form, details, arrangement and proportions of the parts without departing from the scope of my invention.

What I claim is:

1. A centrifugal separating machine for removing particles from a moving gaseous stream, comprising a housing, a rotor mounted axially of the housing with the periphery of the rotor in spaced relation to the inside surface of the housing, means for rotating the rotor, said housing having an inlet means directing the gaseous stream into the housing, imperforate end portions within said housing at the ends of said rotor and one of said end portions being of a diameter substantially equal to the diameter of said rotor and located for preventing passage of the gaseous stream into the end portion of the rotor, that portion of the rotor between the imperforate end portions having perforated surfaces and providing substantially unobstructed passage space within said rotor and throughout a substantially complete revolution thereof and permitting simultaneous radial and axial movement of the gaseous stream through the rotor and freely passing the particles therein to the inner surface of the housing throughout substantially an entire circumferential portion of the rotor, gas withdrawal means communicating with the interior of said housing at a region spaced inwardly from the periphery of said rotor and between said imperforate end portions so that upon rotation of the rotor, the passage of the stream within the rotor to the withdrawal means is along at least one substantially unobstructed vortex-like path decreasing in diameter from the inlet end of the rotor to the withdrawal means, the angular velocity of the stream while traversing the vortex-like path increasing with the decrease in diameter so as to subject the particles carried by the stream toward the withdrawal means to an increasing centrifugal force, thereby separating the particles from the gas and directing the particles to the space peripherally of the rotor for discharge.

2. A centrifugal separating machine in accordance with claim 1 wherein said air withdrawal means is axially disposed relative to said rotor and is of a substantially smaller cross-sectional area than said rotor.

3. A centrifugal separating machine in accordance with claim 1 wherein said perforated surfaces of the rotor are provided by a plurality of longitudinally spaced, flat, perforated disks.

4. A centrifugal separating machine in accordance with claim 1 wherein said perforated surfaces are provided by a foraminous spiral element.

5. A centrifugal separating machine in accordance with claim 1 wherein said perforated surfaces are provided by a plurality of longitudinally spaced, flat perforated disks and said imperforate end portions are provided by imperforate disks disposed longitudinally outwardly of said perforated disks.

6. A centrifugal separating machine in accordance with claim 1 wherein said air withdrawal means includes a tube extending inwardly of one end of said housing, said tube having openings therethrough communicating with the interior of said rotor inwardly of said one end of the housing, and the imperforate end portion of said rotor remote from said one imperforate end portion is of a diameter substantially equal to the diameter of said rotor and sealingly encircles said withdrawal tube outwardly of said openings in the tube.

WILLIAM R. CARTER.

(References on following page)

REFERENCES CITED

The following references are of record in the file of this patent:

UNITED STATES PATENTS

| Number | Name | Date |
|---|---|---|
| 150,650 | Zeck | May 5, 1874 |
| 1,038,513 | Anderson | Sept. 17, 1912 |
| 2,216,939 | Dodge | Oct. 8, 1940 |
| 2,425,410 | Zeitlin et al. | Aug. 12, 1947 |
| 2,569,567 | Korn | Oct. 2, 1951 |
| 2,591,396 | Bergner | Apr. 1, 1952 |

FOREIGN PATENTS

| Number | Country | Date |
|---|---|---|
| 620,108 | France | Jan. 12, 1927 |
| 700,100 | Germany | Dec. 13, 1940 |
| 84,338 | Austria | July 10, 1921 |